(12) United States Patent
Martin et al.

(10) Patent No.: US 7,796,999 B1
(45) Date of Patent: Sep. 14, 2010

(54) METHOD AND SYSTEM FOR NETWORK-DIRECTED MEDIA BUFFER-SIZE SETTING BASED ON DEVICE FEATURES

(75) Inventors: Geoff S. Martin, Overland Park, KS (US); Jonathan R. Kindred, Gardner, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1199 days.

(21) Appl. No.: 11/397,003

(22) Filed: Apr. 3, 2006

(51) Int. Cl.
*H04W 28/18* (2009.01)
*H04W 24/00* (2009.01)

(52) U.S. Cl. .............. 455/456.1; 455/414.1; 455/420; 455/517

(58) Field of Classification Search .............. None
See application file for complete search history.

(56) References Cited

U.S. PATENT DOCUMENTS

| | | | |
|---|---|---|---|
| 5,424,054 A | 6/1995 | Bethune et al. | 423/447.3 |
| 5,897,945 A | 4/1999 | Lieber et al. | 428/323 |
| 6,346,189 B1 | 2/2002 | Dai et al. | 205/766 |
| RE38,223 E | 8/2003 | Keesmann et al. | 313/309 |
| 6,629,151 B1 | 9/2003 | Bahl | |
| 6,757,273 B1 * | 6/2004 | Hsu et al. | 455/453 X |
| 6,856,016 B2 | 2/2005 | Searls et al. | 257/720 |
| 6,864,571 B2 | 3/2005 | Arik et al. | 257/712 |
| 6,887,453 B2 | 5/2005 | Brorson et al. | 423/561.1 |
| 6,909,607 B2 | 6/2005 | Radosevich et al. | 361/699 |
| 6,923,946 B2 | 8/2005 | Geohegan et al. | 423/447.1 |
| 6,936,182 B2 | 8/2005 | Rushford | 216/85 |
| 6,936,565 B2 | 8/2005 | Ma et al. | 502/174 |
| 6,949,931 B2 | 9/2005 | Cole et al. | 324/464 |
| 6,951,001 B2 | 9/2005 | Chen | 716/5 |
| 6,955,937 B1 | 10/2005 | Burke et al. | 438/53 |
| 6,979,244 B2 | 12/2005 | Den et al. | 445/24 |
| 2001/0040872 A1 | 11/2001 | Haglund | 370/235 |
| 2003/0014495 A1 | 1/2003 | Pathak et al. | 709/212 |
| 2003/0086372 A1 | 5/2003 | Pate et al. | 370/235 |
| 2005/0047396 A1 | 3/2005 | Helm et al. | 370/352 |
| 2005/0094622 A1 | 5/2005 | Mallila | 370/352 |
| 2005/0226156 A1 | 10/2005 | Keating et al. | 370/235 |
| 2005/0243846 A1 | 11/2005 | Mallila | 370/412 |

OTHER PUBLICATIONS

J.F. Kurose and K.W. Ross, "Computer Networking: A Top-Down Approach Featuring the Internet", Second Edition, Addison Wesley, Chapter 3, Section 3.5, pp. 228-253, and Chapter 6, Section 6.1-6.4, pp. 523-565, 2003.

A. Cohen and R. Cohen, "A Dynamic Approach for Efficient TCP Buffer Allocation", pp. 1-25, appeared in IEEE Transactions on Computers, vol. 51, No. 3, pp. 303-312, Mar. 2002.

(Continued)

*Primary Examiner*—Philip J Sobutka

(57) ABSTRACT

A method and system for setting buffer size on a wireless communication device (WCD). A network entity receives a streaming-media-session initiation message from the WCD. The network entity determines a WCD buffer size, based at least on one or more features of the WCD, and sends to the WCD a directive to use the determined WCD buffer size. In one example, the network entity may determine the WCD buffer size based at least on media player version in use on the WCD and make and model of the WCD.

20 Claims, 6 Drawing Sheets

OTHER PUBLICATIONS

T. Phelan, "Strategies for Streaming Media Applications Using TCP-Friendly Rate Control", Internet Draft, Oct. 2005.

H. Schulzrinne et al., "Real Time Streaming Protocol (RTSP)", Request for Comments (RFC): 2326, Network Working Group, Apr. 1998.

J. Rew, "Web100: How to Have it All", UCAR Quarterly, http://www.ucar.edu/communications/quarterly/summer01/web100.html, Aug. 8, 2001.

Mescia, N.C. et al. "Plant Automation in a Structured Distributed System Environment", *IBM J. Res. Develop.*, vol. 26, No. 4, Jul. 1982.

Carre, H. et al. "Semiconductor Manufacturing Technology at IBM", *IBM J. Res. Develop.*, vol. 26, No. 5, Sep. 1982.

Gao, et al., *J. Phys. Chem. B* 2000, 104, 1227-1234.

Fan, S. S. et al., "Self Oriented Regular Arrays of Carbon Nanotubes and Their Field Emission Properties," *Science*, vol. 283, pp. 512-514, (1999).

Chandra, Rajit, "Automotive electronics need thermal-aware IC design" *Automotive Design Line*, (Jun. 13, 2005); http://www.automotivedesignline.com/GLOBAL/electronics/designline/shared/article/showArticle.jhtml?articled=164302553&pgno=1.

Hamann, H.F. et al. "Power Distribution Measurements of the Dual Core PowerPC™970MP Microprocessor," ISSCC Dig. Tech Papers, p. 534, Feb. 2006.

Mo, J. et al. "Integrated Nanotube Cooler for Microelectronics Applications," *Proceedings of the IEEE CPMT Conference on Electronics Components Technology (ECTC55)*, May 30-Jun. 3, 2005, Orlando, USA, pp. 51-54.

Margulis, L. et al., *Journal of Microscopy* 1996, 181, 68-71.

\* cited by examiner

| (EXAMPLE VARIABLES) | LOCATION (E.G., CITY/ STATE, CELL ID, BTS ID, ETC.) | TIME OF DAY | # OF WIRELESS USERS HISTORICALLY PRESENT AT THE LOCATION AND THE TIME OF DAY | # OF WIRELESS USERS CURRENTLY IN ACTIVE DATA SESSIONS AT THE LOCATION | EMPIRICAL DATA THROUGHPUT FOR THE LOCATION | TYPE OF DEVICE (E.G., MAKE/MODEL, MEDIA PLAYER (MP) VERSION, ETC.) | VARIABLE X, Y, Z... | SCORE AND CORRESPONDING BUFFER SIZE PARAMETER |
|---|---|---|---|---|---|---|---|---|
| METRIC | SAN ANTONIO, TX | 2:30 AM | 955 | 905 | XX KBPS | MAKE 1/ MODEL 1 *MP V. 2.3.1 | ... | |
| SCORE | X | X | X | X | X | X | ... | SCORE = X BUFFER SIZE = X |
| METRIC | NEW YORK CITY, NY | 10:15 AM | 2,350 | 2,565 | XX KBPS | MAKE 2/ MODEL 2 *MP V. 2.4.0 | ... | |
| SCORE | X | X | X | X | X | X | ... | SCORE = X BUFFER SIZE = X |

FIG. 5

METHOD AND SYSTEM FOR NETWORK-DIRECTED MEDIA BUFFER-SIZE SETTING BASED ON DEVICE FEATURES

BACKGROUND

1. Field of the Invention

The present invention relates to telecommunications and, more particularly, to methods and systems for setting buffer size on a wireless communication device.

2. Description of Related Art

Wireless communication devices, such as mobile phones or other portable devices, may be presently capable of receiving "streaming" multimedia content over a network for playback to a user. In streaming, a media file does not need to be downloaded to a wireless communication device in its entirety, but rather can be played out to the user via a media player on the device in "real-time" as it is being downloaded to the wireless communication device from the network (e.g., from a network server, generally known as a "streaming media server"). In today's wireless networks, wireless subscribers may now, for example, use their wireless communication devices to receive streamed music/video files and even live TV and radio broadcasts.

Typically, in packet data networks, a sending entity will break a media stream down into chunks that are then each combined with additional header information to form a data packet for transmission over a network. Ideally, data packets would arrive at a wireless communication device at a constant rate (e.g., successive data packets would arrive 20 milliseconds apart). However, due to network congestion and/or other network-induced delays (e.g., queuing delays at intermediate network elements), individual data packets often suffer undesirable delays as they are being transported across the network, such that the time gaps between successive packets in a packet stream can vary. These variable "inter-packet gaps" are generally known as packet jitter.

To compensate for the effects of jitter and other variations, a media player on a wireless communication device will generally not play out media data contained in packets as soon as the packets arrive at a wireless communication device from a network. Rather, the packets will be temporarily stored in a data storage known as a "media buffer" (or "playback" or "playout" buffer) to "smooth out" the media stream for playback to a user. More specifically, the media buffer will hold the received data packets for a period of time before release for playout in order to buffer enough data to provide a substantially continuous media presentation to the user.

For example, in the beginning of a streaming media session, when the media buffer is empty, the media buffer may be filled with data before a media playout can begin. As a result, the user will typically experience a few-second delay before enjoying the streaming-media content. Subsequently, the media buffer may be continuously re-filled with data as more data packets continue to arrive from the network and the media player empties, or drains, the buffer.

Typically, a wireless carrier may set the size of a media buffer at some fixed default value (e.g., a number of seconds of media playout time, a number of bytes or packets, etc.) for use across all of its wireless subscribers' devices. A wireless subscriber's device will then use this default buffer-size setting for all streaming media sessions initiated by the device. Various problems, however, may arise with respect to such fixed default buffer size setting.

For example, if a media buffer size is set too large, a user may be initially forced to wait for too long for the media playout to begin. On the other hand, if the media buffer size is set too small, the media buffer may not provide a sufficient buffering delay during the streaming media session to remove jitter and/or other variations from a packet stream, resulting in video jerkiness, choppy audio, and/or other media degradations.

In addition, the media buffer size may not be adapted to variations in wireless network data transmissions rates (e.g., based on a location where a wireless communication device is located at the streaming-media-session initiation and/or network congestion during the streaming media session) that may lead to buffer underflows (i.e., empty-buffer conditions) or buffer overflows. To illustrate, in one example, during a period when the rate at which the wireless communication device receives data packets drops, the media buffer may underflow, because the media player may drain the media buffer at a faster rate than the rate at which data can flow into the buffer to re-fill the buffer. This may introduce undesirable pauses into the media stream being played out to a user.

Further, the current practice among wireless carriers of setting the size of a media buffer at some fixed default value for use across all their wireless subscribers' devices may not be desirable, since various wireless communication devices may inherently have different features/capabilities. For example, various makes/models of wireless communication devices may have different media player versions that may have different capabilities and characteristics, such as different buffer size limitations, buffer size specifications for optimal streaming performance, etc.

Thus, a need exists for a more selective method of selecting a suitable buffer size for use on a wireless communication device, and particularly, at the streaming-media-session initiation.

SUMMARY

The present invention provides a method and system for (i) determining in a network, at the initiation of a streaming media session by a wireless communication device (WCD), a suitable buffer size for use on the WCD based at least on one or more features of the WCD, and further, (ii) directing the WCD to use the determined buffer size. Accordingly, the WCD may set the size of its buffer (e.g., a media buffer) to the determined buffer size for the duration of the streaming media session.

More particularly, in one disclosed embodiment, a network entity (e.g., a streaming media server or other server) may receive a streaming-media-session initiation message from the WCD. The network entity may determine a WCD buffer size, based at least on one or more features of the WCD, and may send to the WCD a directive to use the determined WCD buffer size.

The one or more features of the WCD may include, for example, media player version in use on the WCD and make and model of the WCD. Further, in some embodiments, other factors in addition to the WCD features may be taken into consideration when determining the WCD buffer size. For instance, the network entity may further consider a present geographic location of the WCD and/or one or more conditions (e.g., a level of congestion) in a radio access network (RAN) currently serving the WCD to tailor the WCD buffer size accordingly.

Advantageously, at the time of the streaming-media-session initiation, the network entity can dynamically determine an optimal buffer size setting for use on the WCD based on the device's feature(s) and other relevant factors, and direct the WCD to use the determined buffer size to enhance a streaming-media experience of a user during the streaming media session.

These as well as other aspects and advantages will become apparent to those of ordinary skill in the art by reading the following detailed description, with appropriate reference to the accompanying drawings.

BRIEF DESCRIPTION OF THE DRAWINGS

FIG. 5 illustrates an example of a table stored in a buffering database; and

DETAILED DESCRIPTION OF PRESENTLY DISCLOSED EMBODIMENTS

1. Brief Overview

Figure 1:
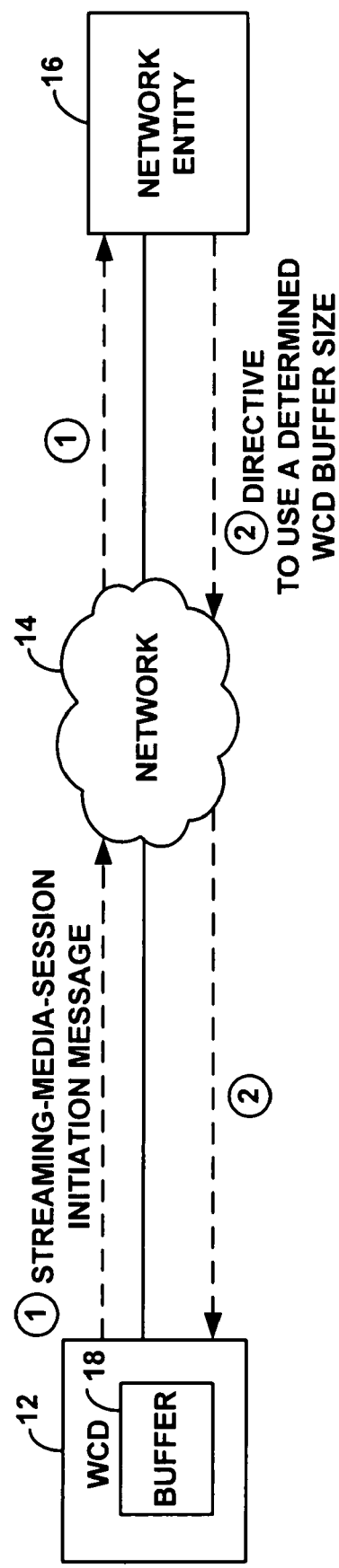
FIG. 1 is a simplified block diagram of one example arrangement operating in accordance with an illustrative embodiment of the invention.

FIG. 1 illustrates a block diagram of a simplified arrangement in which a WCD 12 is coupled via a network 14 to a network entity 16. Further, as shown in FIG. 1, the WCD includes a buffer 18 that generally represents any one or more buffers on the WCD that may be used during a streaming media session.

In one example scenario, a user of WCD 12 may select a media file (e.g., a music video clip) to be streamed, triggering the WCD to set up a streaming media session for the file. In particular, as shown in FIG. 1, the WCD may be arranged to send a streaming-media-session initiation message over network 14 to network entity 16. The network entity may be, for example, a streaming media server that will serve the file to the WCD or another network element that will provide the WCD with a network address of the streaming media server.

Once the streaming media session has been set up, WCD 12 can begin to stream the media file for presentation to the user. As noted above, a media player on WCD 12 will likely delay the playout of media packets for some time by temporarily storing the media packets in a media buffer as they arrive from network 14. For example, the size of the media buffer may be set such that, at a given moment, the buffer may hold enough data for a few seconds of media playout time.

As noted above, in some cases, the size of the media buffer size may adversely affect user experience during a streaming media session. Thus, it may be desirable to set the buffer size at the initiation of the streaming media session in such manner as to enhance the user experience.

Figure 2:
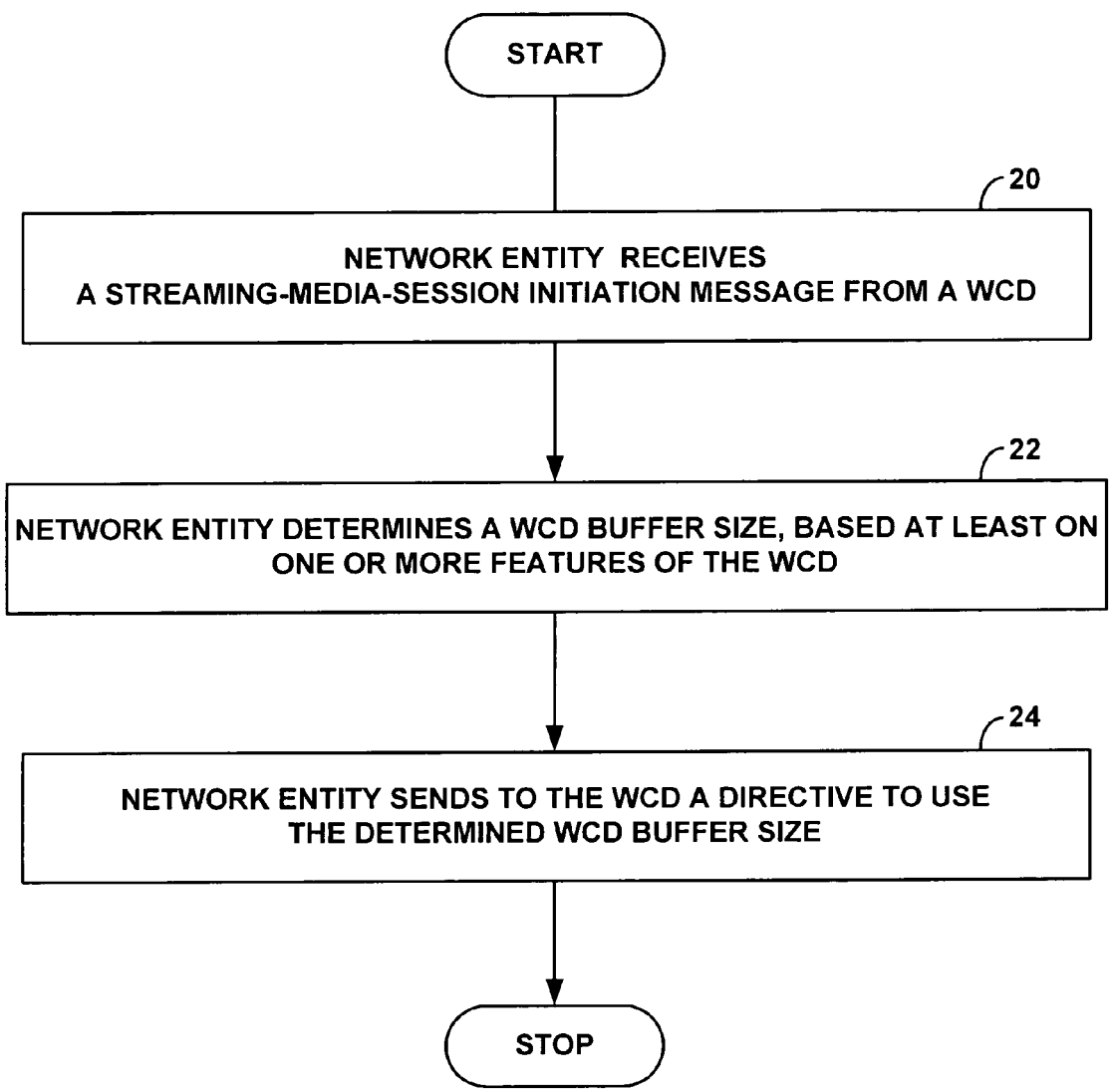
FIG. 2 is a flow chart depicting functions that may be carried out according to the illustrative embodiment.

FIG. 2 is a flow chart generally depicting a set of functions that could be carried out in accordance with the illustrative embodiment, in the arrangement shown in FIG. 1 for instance. In one example, network entity 16 may include a processing system (e.g., implemented in the form of one or more processors and program instructions executed by the processor(s)) that could be arranged to carry out such set of functions.

As shown in FIG. 2, at step 20, network entity 16 may receive a streaming-media-session initiation message from WCD 12. At step 22, the network entity may determine a WCD buffer size, based at least on one or more features of the WCD. Finally, at step 24, the network entity may send to the WCD a directive to use the determined WCD buffer size.

2. Network Implementation

Figure 3:
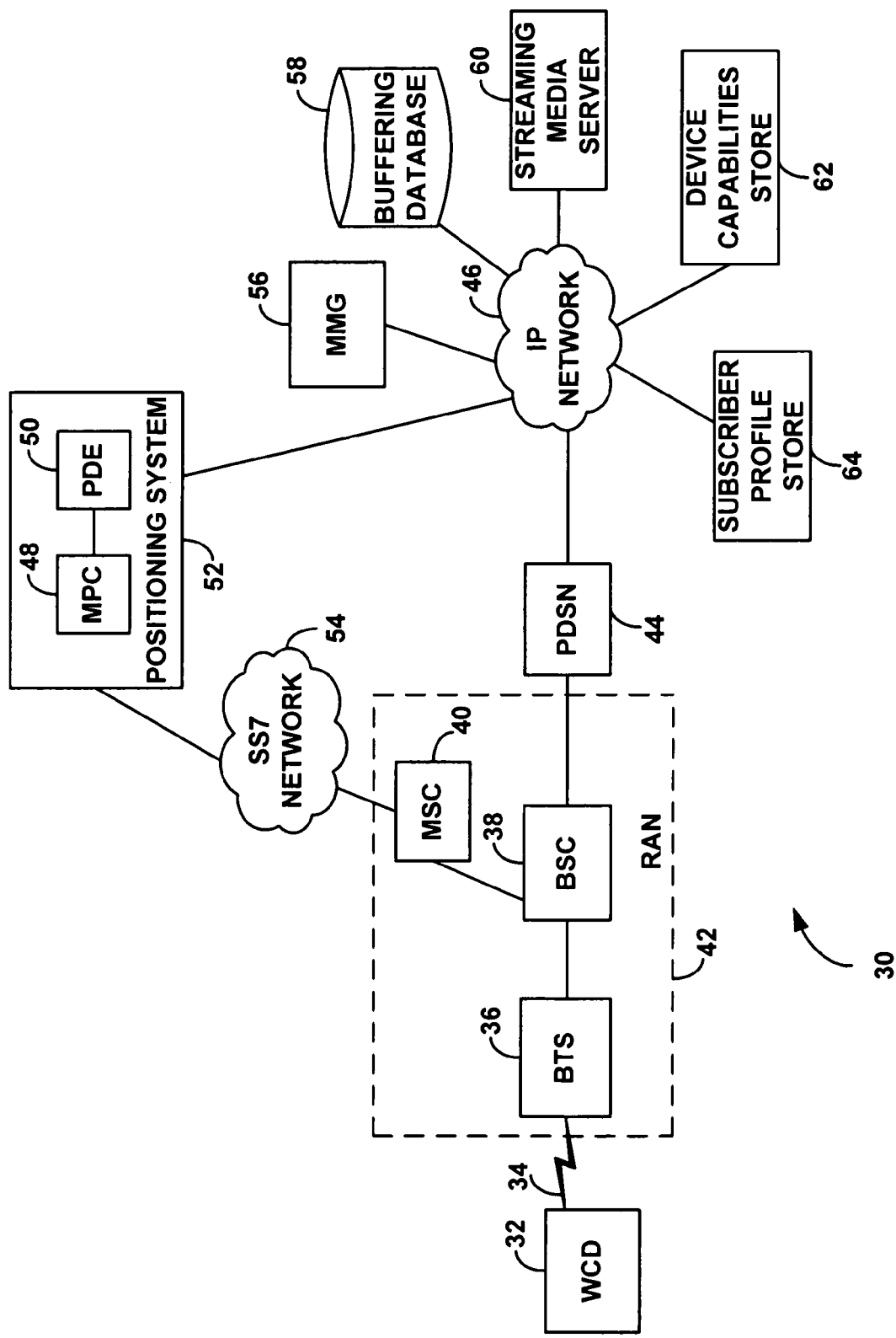
FIG. 3 is a block diagram of a more detailed network arrangement in which the illustrative embodiment can be employed.

FIG. 3 is a simplified block diagram depicting an example of a network arrangement 30 in which the illustrative process shown in FIG. 2 can be implemented.

Note, however, that this and other arrangements described herein are provided by way of example only, and other arrangements and elements (e.g., machines, interfaces, functions, orders of elements, etc.) can be added or used instead and some elements may be omitted altogether. Further, those skilled in the art will also appreciate that many of the elements described herein are functional entities that may be implemented as discrete components or in conjunction with other components, in any suitable combination and location, and various functions could be carried out by software, firmware and/or hardware.

As shown in FIG. 3, network arrangement 30 includes a WCD 32 (e.g., a mobile phone, a personal data assistant (PDA), a laptop and/or other wireless data-enabled terminal) including one or more buffers (e.g., a media buffer) that may be used during a streaming media session. WCD 32 is wirelessly coupled over an air interface 34 with a base transceiver station (BTS) 36, which normally serves to provide an RF coverage within a given cell site, or cell. Conventionally, BTS 36 will include a cell tower with one or more antennas that radiate to define a number of cell sectors. BTS 36 is then coupled with a base station controller (BSC) 38, which generally manages radio resources (e.g., channel frequency allocation for the air interface) to facilitate wireless communications between the WCD and the BTS. Although FIG. 3 shows the BSC and the BTS as separate entities, these two entities could be co-located or could otherwise be viewed as a "base station".

BSC 38 may be, in turn, coupled to a mobile switching center (MSC) 40 that typically serves as a control element for a wireless network. Alternatively, the MSC and the BSC may be integrated as a single network element. The combination of the BTS, the BSC, and the MSC may generally form a radio access network (RAN) 42.

As further shown in FIG. 3, BSC 38 may be also coupled with a suitable gateway, such as a packet data serving node (PDSN) 44 as used in CDMA-based networks, providing connectivity with a packet-switched data network, such as an IP network 46. IP network 46 may be a public and/or private network, such as the public Internet and/or a wireless carrier's private core network. For example, a user of WCD 32 could access various public streaming media sources over the Internet, as well as private streaming media sources sitting on a wireless carrier's network.

As further depicted in the arrangement of FIG. 3, a wireless carrier may operate a mobile positioning center (MPC) 48 that is arranged to determine and report locations of WCDs to requesting entities. The MPC may include or have access to a position determining entity (PDE) 50, which may operate to determine the location of a given WCD. (Note that FIG. 3 depicts MPC 48 and PDE 50 as components of a positioning system 52 coupled to MSC 40 via an SS7 network 54 and further coupled to IP network 46; in other cases, positioning system 52 can take other forms, possibly including just one of these entities or some other entities altogether.)

A location request to the MPC (or more generally to positioning system 52) may seek either a general or specific indication of the WCD's location. A general indication of the WCD's location may be an indication of the location of the cell/sector in which the WCD is currently operating. A specific indication of the WCD's location, on the other hand, could be a more precise indication of the geographic position of the WCD itself.

To learn the cell/sector that is currently serving a WCD, the MPC may send a "low accuracy" location request to the RAN that is currently serving the WCD, and the RAN may respond with an indication of the cell/sector in which the WCD is currently operating. To learn a more specific geographic position of the WCD, on the other hand, the MPC may send a "high-accuracy" location request to the PDE, and the PDE may then send one or more high accuracy location requests to the serving RAN and receive high accuracy positioning data.

Further, coupled to IP network 46 are shown a multimedia gateway (MMG) 56, a buffering database 58, a streaming media server 60, a device capabilities store 62, and a subscriber profile 64.

In general, streaming media server 60 may store/broadcast various media content and serve the requested media content to WCD 32 during a streaming media session. Although, the streaming media server is the entity that may serve media to WCD 32, typically, WCD 32 may initially direct its request to initiate the streaming media session to an intermediate network entity rather than directly to the streaming media server. In response to the request from the WCD, such entity could then provide the WCD with a network location of a media file (or a network address of a streaming media server that will serve the file). The intermediate network entity could be, for example, a web server or another entity, such as MMG 56 comprising a server (e.g., a server application) that functions as this "media proxy". In addition, MMG 56 could perform various other network functions, such as transcoding of multimedia content. (Note that, in an alternative arrangement, the streaming media server and the MMG could be embodied within the same network element.)

To facilitate a set up and control of a streaming media session, the industry has defined a Real-Time Streaming Protocol (RTSP). Generally, the RTSP specifies signaling to control the playback of a media stream, allowing a user (when possible) to start, pause, stop, fast forward/rewind, start the playback at different points within the media stream, etc. RTSP signaling messages can be exchanged directly between a media player and a streaming media server, for instance. Generally, the RTSP is regarded as an "out-of-band" protocol, because a different application-layer protocol, such as Real Time Protocol (RTP) or some other proprietary protocol, is used for encapsulation of streaming media in packets for transmission over a network.

In a typical streaming media session setup under RTSP, WCD 32 may request from MMG 56 a presentation description file, which provides, among others, a name and a network location of a media file to be streamed (e.g., one or more URLs providing the name(s) of the media stream(s) within the file and host domain name(s) (e.g., a network address of streaming media server 60)). The request may be an HTTP (GET) request message or another type of message. In response, the MMG may encapsulate the presentation description file in an HTTP response message and send it back to the WCD. A media player on the WCD and streaming media server 60 may then communicate a series of RTSP messages to start and control the streaming media session.

In particular, the media player may send an RTSP SETUP request message, and the streaming media server may respond with an RTSP OK message. The media player may then send an RTSP PLAY request message for a given media stream, for example, and the server may respond with an RTSP OK message and begin serving the requested media stream to the media player. Later, to complete the session, the media player may send an RTSP TEARDOWN request message, and the streaming media server may confirm with an RTSP OK response message.

Note that in the above description, the initial HTTP request message may come from a web browser, such when a user invokes the streaming media session through a web page, for example. After receiving the HTTP response message, the web browser may invoke the media player to communicate with the streaming media server. Alternatively, the initial HTTP request message may come directly from the media player, such when the user invokes the streaming media session through the media player.

Further, referring back to FIG. 3, device capabilities store 62 may hold a Composite Capabilities/Preferences Profile (CC/PP) profile, which is generally a description of device capabilities and user preferences. The CC/PP profile is typically used to deliver content that is tailored to the capabilities of the device. A CC/PP profile contains a number of attributes that may be used by a server (e.g., a content server) to determine the most appropriate form of content to deliver to the device. Device attributes in the CC/PP profile may be related to the overall hardware platform of the device, the software platform which hosts all applications, or individual applications, such as, e.g., a media-player application. As such, device capabilities store 62 may store, for example, the version of a media player in use on the device, make/model of the device, and other information about the features of the device.

Subscriber profile store 64 may hold various subscriber information, including, for example, the services that a user of WCD 32 subscribes to.

Figure 4:
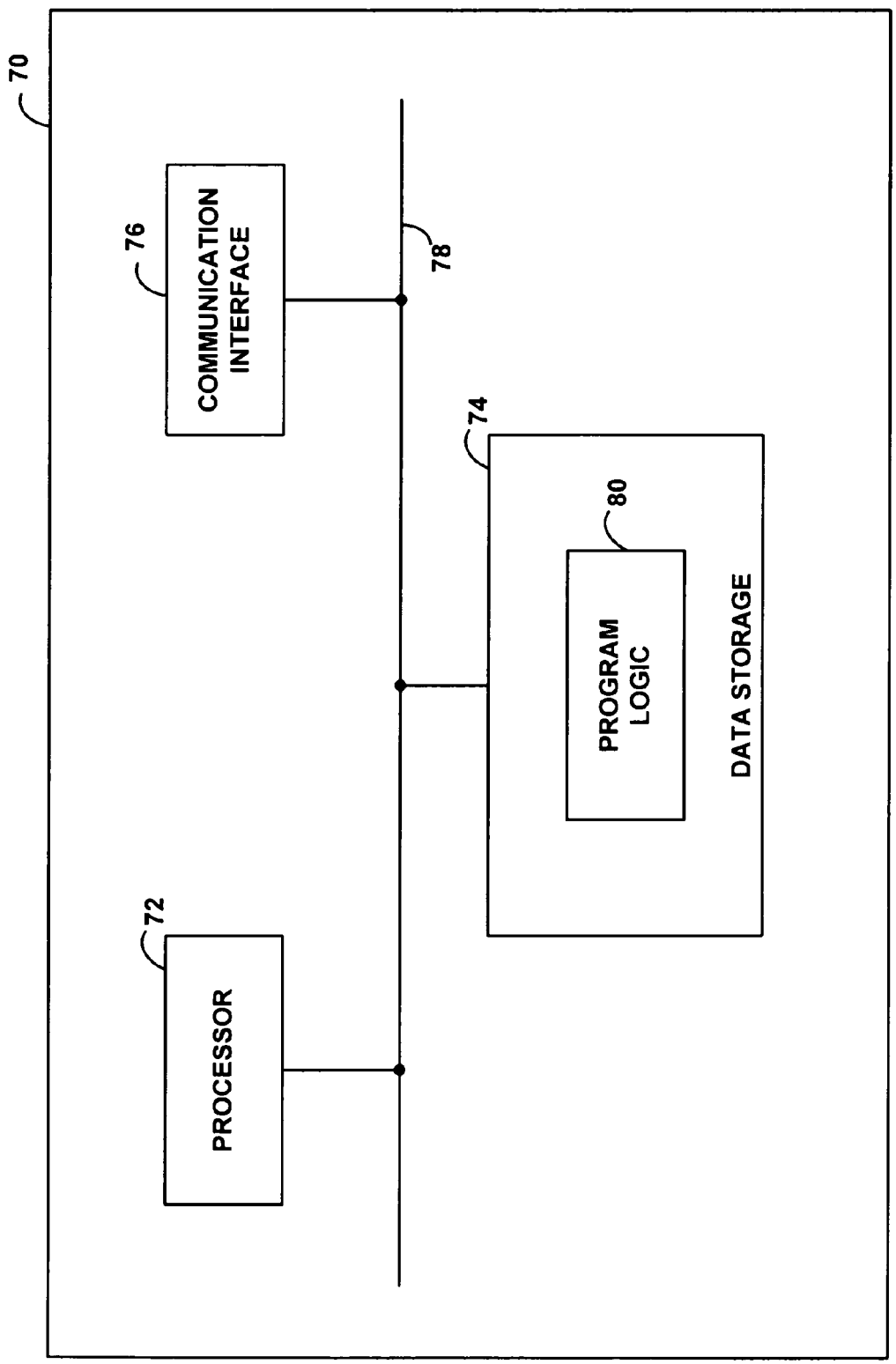
FIG. 4 is an example of a network entity arranged according to the illustrative embodiment.

In one embodiment, the user may subscribe to an enhanced streaming-media service (e.g., a "premium streaming package"), in which a network entity, such as a network entity 70 shown in FIG. 4, may be arranged to dynamically determine at the streaming-media-session initiation a buffer size for use on the WCD, based at least on one or more features of the WCD to enhance the user's streaming experience. Further, in the illustrative embodiment, buffering database 58 may store data that can be referenced by the network entity to facilitate the determination of the WCD buffer size. Although in FIG. 3 buffering database 58 is shown as a separate network element, the buffering database could instead be located within MMG 56, streaming media server 60, and/or some other element.

FIG. 4 illustrates in greater detail one example of network entity 70 arranged to carry out various functions described herein. As depicted in FIG. 4, network entity 70 may include a processor 72, a data storage 74, and a communication interface 76, all tied together via a system bus or other mechanism 78. Other components in addition to those depicted in FIG. 4 may be included.

Note that components depicted in FIG. 4 are shown for purpose of example only and variations are possible. As one example, the components may be located within a single functional unit or a plurality of functional units. In this regard, for instance, data storage 74 may instead be located in a physically separate location from processor 72, with a means for connecting the data storage and the processor.

Communication interface 76 may be generally any type of hardware/software interface(s) that facilitates communications between network entity 70 and other entities coupled to IP network 46. As an example, communications to/from WCD 32 sent over PDSN 44 and IP network 46 may pass through this interface.

Processor 72 may be one or more general purpose processors (such as INTEL PENTIUM class processors or better) and/or dedicated processors (such as digital signal processors), and data storage 74 may be any suitable sort of storage, whether volatile and/or nonvolatile. As shown in FIG. 4, data storage 74 may hold program logic 80 (e.g. machine language instructions) executable by processor 72 to carry out various functions described herein, including (i) receiving a streaming-media-session initiation message from a WCD, (ii) determining a WCD buffer size, based at least on one or more features of the WCD, and (iii) sending to the WCD a directive to use the determined WCD buffer size.

Network entity 70 can take various forms and generally may be any entity that may receive a streaming-media-session initiation message from a WCD, where the streaming-media-session initiation message may be any type of message used to initiate the streaming media session.

To illustrate, in one example embodiment, in the network arrangement of FIG. 3 for instance, when a user of WCD 32 wishes to begin a streaming media session (e.g., the user activates a media player and selects a media file for playout or selects a media file through a web browser during a web browsing session), WCD 32 may send an HTTP request message to MMG 56 that may be programmed with program logic 80. Although not shown in FIG. 3, the HTTP communications to/from WCD may pass via a WAP gateway sitting on IP network 46.

In the present embodiment, the HTTP request message may serve as a streaming-media-session imitation message. Upon receipt of the HTTP request message, MMG 56 may determine an optimal WCD buffer size based at least on one or more device features, and send a directive to WCD 32 to use the determined buffer size. For example, MMG 56 may provide the buffer-size setting value to WCD 32 in a response message, such as an HTTP response message. In turn, WCD 32 may be programmed to set the buffer size according to the directive received from the MMG. Subsequently, WCD 32 may use the determined buffer size for the duration of the streaming media session.

In order to transmit the HTTP request message to MMG 56, WCD 32 may initially need to establish IP connectivity with IP network 46. Alternatively, the WCD may already have acquired IP connectivity, e.g., if WCD 32 is engaged in a web browsing session and invokes a streaming media session through a web browser. To establish IP connectivity with IP network 46, BSC 38 may allocate necessary radio resources (e.g., a radio channel) to the WCD to communicate packet data to/from BTS 36 over air interface 34 and a data link layer connection may be established between the WCD and PDSN 44.

Preferably, the WCD will be arranged (e.g., programmed with appropriate processor-executable program instructions) to include a device identifier, such as a Network Access Identifier (NAI), an Electronic Serial Number (ESN), a Mobile Identification Number (MIN), a Mobile Directory Number (MDN), an International Mobile Subscriber Identifier (IMSI)), and/or some other identifier, in the HTTP request message. This device identifier may be, for example, included as an attribute in any suitable field in the header of the HTTP request message.

Upon receipt of the HTTP request message carrying the device identifier, MMG 56 may be programmed to query subscriber profile store 64, to determine, for example, if the WCD is subscribed/authorized for the enhanced streaming-media service as noted above. This step, however, may be omitted altogether if a wireless carrier offers this service to all its subscribers, for instance.

Using the device identifier, MMG 56 may then query device capabilities store 62 to determine one or more features of the WCD, such as (i) media player version in use on the WCD and (ii) make and model of the WCD. Other device features may be additionally, or alternatively, determined. Alternatively, one or more of the device features may be provided directly by the WCD in the streaming-media-session initiation message. As an example, the media player version may be included along with the device identifier in the HTTP request message sent to MMG 56. Based at least on the device features, the MMG may then determine a buffer size to be used on WCD 32 for the streaming media session.

In one preferred embodiment, MMG 56 may further consider a geographic location of WCD 32 to determine a suitable WCD buffer size for the streaming-media session. Typically, when a WCD initiates a streaming media session in a geographic location where a wireless network is currently congested and/or has been historically known to be congested (e.g., at particular times of day), media packets may experience undue delays as their being transported through the wireless network to the WCD.

Thus, it may be desirable to initially set a buffer size to be large enough to account for possible network-induced jitter/delays to ensure a smooth media playout on the user side for the duration of the streaming media session. Otherwise, a media buffer that is too small may not introduce enough playback delay to remove the jitter and/or may frequently underflow, resulting in stops, jerkiness, choppy audio, etc., and thus degrading user streaming-media experience. In contrast, if the WCD initiates the streaming media session in a geographic location where network congestion is low, it may be undesirable to set the buffer size to be too large. This may cause data packets to be held in the media buffer for a longer period of time than necessary, unduly delaying the delivery of media content for playback to the user.

Further, the geographic location of WCD 32 may also provide an indication of the type of wireless network (e.g. a CDMA IS-95A/B network, a CDMA 2000 1xRTT network, a CDMA 2000 1xEV-DO network, etc.) that the WCD is currently operating in. In CDMA-based networks for instance, higher data transmissions rates (e.g., from 38.4 kbps and up to 2457.6 kbps) may be possible if WCD 32 is currently operating in a 1xEV-DO network rather than an IS-95B network, for instance. In particular, a 1xEV-DO-capable WCD will continuously evaluate its current RF channel conditions and will notify BTS 36 of the date rate currently supportable by the WCD. The BTS will then serve data to the WCD at the requested rate. In general, the better current RF channel conditions of the WCD, the higher the data rate that the WCD can support.

A wireless carrier may, for example, provide some coverage areas in which WCDs can operate only under the traditional IS-95B/IS-2000 protocol. However, it can also provide 1xEV-DO coverage areas in selected locations. If a WCD is properly equipped and authorized for 1 xEV-DO-service, whenever present within a 1x-EV-DO coverage area, the WCD can benefit from being able to stream data at higher speeds than it is possible in lower data-throughput CDMA coverage areas. Thus, in the illustrative embodiment, higher data transmissions rates possible within 1xEV-DO coverage may be further considered when determining a WCD buffer size.

For example, if an EV-DO-capable WCD is located in a 1xEV-DO coverage area at the time of a streaming-media-session initiation, it may be desirable to set the WCD buffer size large enough in anticipation of data being delivered to the WCD at higher rates than if the WCD device was located in a lower data-throughput CDMA network coverage. Otherwise, a buffer that is too small may not have sufficient capacity to handle higher rates at which packets will be streamed to the WCD and may suffer overflows, for instance. As another example, if the media buffer is set to a larger size initially, it may be better adapted to utilize higher bandwidth available to the wireless connection, so that larger portions of a media file (possibly even the entire file) may be "fit" into the media buffer. Other examples may also be possible.

To determine a current geographical location of WCD 32, MMG 56 may send a location request to position determination system 52 via IP network 46. In turn, the position determination system may return the location of the WCD to the MMG. The location may be, for example, an indication of a cell/sector (e.g., a sector pseudo-noise (PN) offset, a Cell ID, a BTS ID, etc.) in which WCD 32 is currently operating or a specific indication of the WCD's location (e.g., location coordinates).

In one alternative embodiment, WCD 32 may be equipped with location-positioning means, such as a GPS receiver, in which case, the WCD itself may be able to determine its own position and report that position along with the device identifier in a streaming-media-session initiation message, such as the HTTP request message provided to MMG 56.

Given the one or more features of WCD 32 as determined from device capabilities store 62 and/or the information in the HTTP request message, possibly along with the location of WCD 32, MMG 56 could then refer to buffering database 58 to determine a buffer size for use on WCD 32.

FIG. 5 illustrates an example of a table 90 that may be kept in buffering database 58 and referenced by MMG 56 to determine a WCD buffer size based at least on one or more WCD features, possibly in combination with other characteristics associated with the WCD. Generally, table 90 may hold any number of key variables, with a score assigned to each variable. As shown in FIG. 5, some of the example variables may include: a location (e.g., a city/state, a Cell ID, a BTS ID, etc.), a given time of day, a number of wireless users historically present at the location at the given time of day, a number of wireless users currently active in data sessions at the location, an empirical data throughput for the location, and/or a device type (e.g., make/model, media player version, etc.). Other variables may be additionally included (e.g., a size of a media file to be streamed, the type of wireless coverage (e.g., an 1xEV-DO coverage) available at the location, etc.), as generally noted in the table by "Variable X, Y, Z . . . ", and/or some variables may be omitted altogether.

By combining a total score across different variables, a corresponding total buffer size for use on a given WCD may be determined. A score associated with a given variable could be a binary value and/or an analog value expressing buffer size in units of time (e.g., a number of seconds of media playout time (e.g., 20 seconds)) and/or data capacity, such as bytes or packets. By way of example, for a given WCD of Make 2/Model 2 and media player (MP) version 2.4.0 that is currently located in New York City, the score associated with that location may "add" some extra buffer space (e.g., +N KB or +N sec.) to the total buffer size to account for possible network congestion at that location. In contrast, a low number of current wireless users at that location may indicate a low level of congestion at that location and may "subtract" some buffer space (e.g., −N KB or −N sec.) from the total buffer size. Similarly, a score based off a given make and model of a device and/or media player version may account for the device buffer characteristics and/or device capabilities.

Table 90 may be maintained by a wireless carrier and updated on a regular basis with the latest information. For example, a wireless carrier may normally collect various data regarding network performance over time. Such data may be analyzed to determine areas of network congestion, peak times of congestion, etc. Given such network analysis, the wireless carrier may identify those areas in the network where improvements may be needed. For example, the wireless carrier may deploy more base station equipment in the areas where volume of traffic is high. Such or similar data may be also used to determine, for example, a number of wireless users historically present at selected locations at various times of day, and/or other variables in table 90 related to network performance over time.

Alternatively, some of the table variables may be updated dynamically with each streaming-media-session initiation message. For example, data regarding current network conditions, such as a current number of wireless users in active data sessions, may be directly obtained from RAN 42.

As noted above, BSC 38 may normally manage radio channel resources, and could thus already have a knowledge of the current network conditions (e.g., a level of congestion) within RAN 42. Based on the location of WCD 32 (e.g., a BTS ID), MMG 56 could determine which BSC is currently serving WCD 32 and could query that BSC (i.e., BSC 38) to learn of one or more current conditions within RAN 42 (e.g., a number of users in active data sessions). In turn, the BSC could be arranged to respond to the MMG with the requested information. MMG 56 could then update table 90 with the current data specifically related to WCD 32. Further, table 90 may be configured such that when a metric associated with a given variable parameter is updated, a corresponding score may be automatically calculated and updated in the table as well.

According to the illustrative embodiment, once MMG 56 determines a WCD buffer size for use on WCD 32, the MMG may send to the WCD a directive to use the determined WCD buffer size. In one example, as noted above, the MMG could send an indication of the determined buffer size within an HTTP response message carrying a presentation description file (e.g., an URL), such as within HTTP header fields of the response message. When the WCD receives the message, the WCD may be programmed accordingly to extract the buffer size attribute from the HTTP response message and set the size of its media buffer accordingly. Further, a media player on WCD 32 may signal to streaming media server 60 to complete the set up of the streaming media session.

In an alternative embodiment, various functions described above may be instead carried out by streaming media server 60 that may be programmed with program logic 80. For example, an RTSP SETUP request message may serve a streaming-media-session initiation message that will trigger the streaming media server to determine a WCD buffer size based at least on one or more features of the WCD, and send a directive to the WCD to use the determined WCD buffer size. The directive could be an RTSP OK message carrying an indication of the determined WCD buffer size. When the WCD receives the RTSP OK message, the WCD may be programmed accordingly to extract the buffer size attribute from the RTSP OK message and set the size of its media buffer accordingly. Other examples may also be possible.

Figure 6:
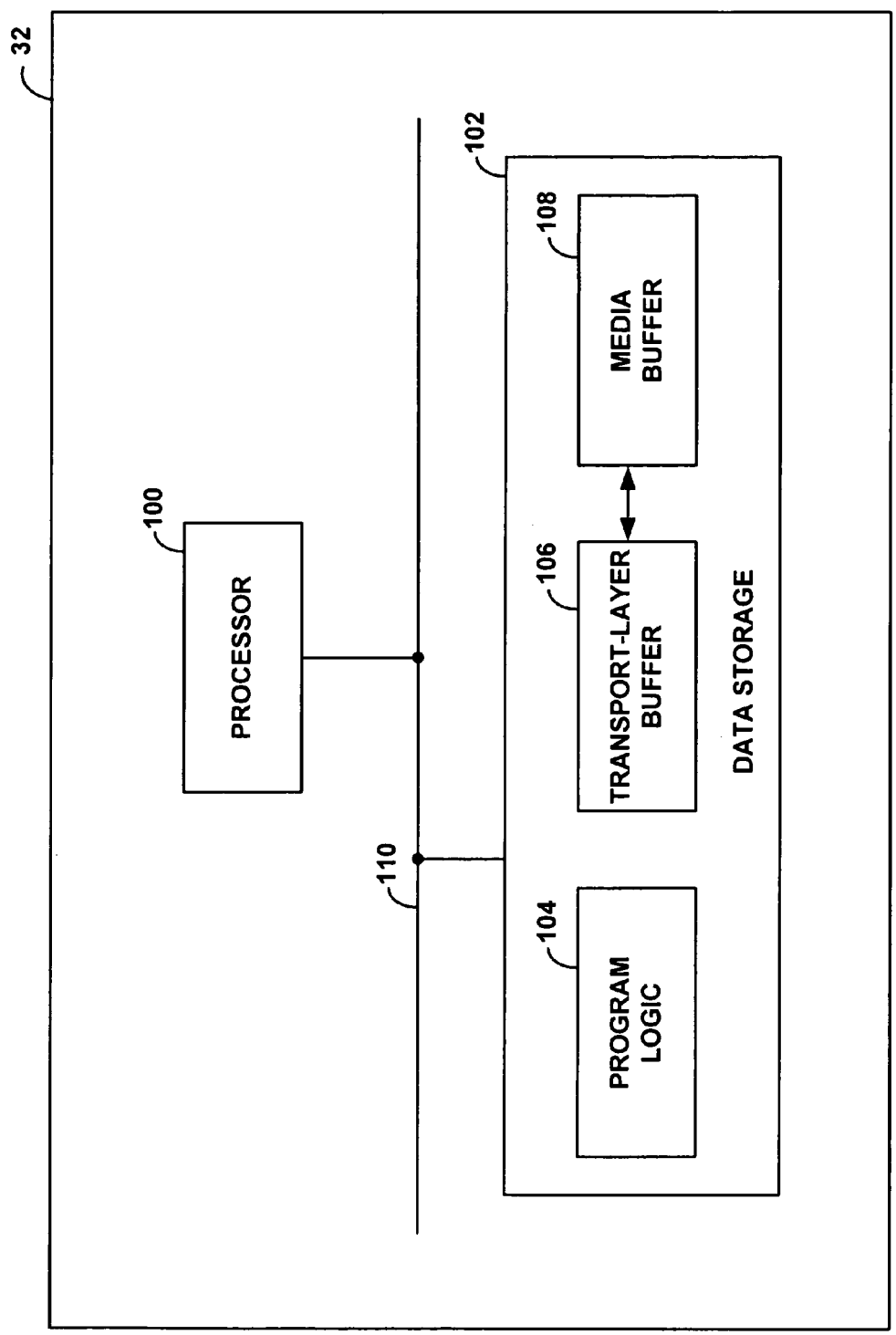
FIG. 6 is a block diagram of a WCD arranged in accordance with the illustrative embodiment.

FIG. 6 illustrates in greater detail functional components of representative WCD 32 arranged to carry out the functions described herein. As shown in FIG. 6, WCD 32 may include a processor 100 and a data storage 102 defining a transport-layer buffer 106 and a media buffer 108, with the processor and the data storage being interconnected by a system bus or other mechanism 110. Note that additional components not shown in FIG. 6 may be included. As one example, WCD may include a communication interface comprising an antenna and a chipset for conducting RF communications in air interface 34 according to a suitable communication protocol. As another example, WCD 32 may include a GPS receiver, such that WCD 32 can determine its own position and include an indication of its position in a streaming-media-session initiation message sent to network entity 70, such as MMG 56 or streaming media server 60.

Processor 100 may be one or more general purpose processors (such as INTEL PENTIUM class processors or better) and/or dedicated processors (such as digital signal processors), and data storage 102 may be any sort of storage, whether volatile and/or nonvolatile. As depicted in FIG. 6, data storage 102 may hold program logic 104 (e.g. machine language instructions) executable by processor 100 to carry out various functions described herein, including (i) sending a streaming-media-session initiation message to a network entity, (ii) receiving from the network entity a directive to use a buffer size determined based at least on one or more features of the WCD, and (iii) setting the buffer size according to the directive received from the network entity.

As shown in FIG. 6, WCD 32 may include transport-layer buffer 106 and media buffer 108. As is typical, an application-level data, such as RTP packets for example, will be transported using an appropriate type of transport-layer protocol, such User Datagram Protocol (UDP) or Transmission Control Protocol (TCP). In particular, if the application-layer process, such as a streaming media application, runs on top of TCP, a TCP connection will be established between the WCD and a sending entity. In particular, WCD 32 will allocate a TCP receive buffer, such as transport-layer buffer 106, to the TCP connection. The sending entity will encapsulate the RTP packets in TCP segments that are then handed down to a network layer (e.g., IP) for transmission to the WCD. As the data packets arrive at the WCD, the TCP header information is stripped off TCP segments to extract RTP packets, which are then placed into the TCP buffer for transfer via a TCP socket to media buffer 108. For example, a media-player application may be arranged to read the data from the TCP buffer and into the media buffer any time the TCP buffer is filled up.

In some instances, problems may arise with regard to the size of transport-layer buffer 106, such as the TCP buffer described herein. In one example, if the TCP buffer size is set too large, it may take too long to fill up the TCP buffer with data for transfer to media buffer 108, thus further delaying media playout to a user. In another example, if the TCP buffer size is set too small, it may not be able to hold more data to support higher-bandwidth wireless connections, since the data transmissions to the TCP buffer will typically be "throttled" until the filled-up TCP buffer is emptied.

Advantageously, in one preferred embodiment, the illustrative method of setting a WCD buffer size at a streaming-media-session initiation, as described herein, may be used to set the size of a TCP buffer (or a transport-layer buffer generally). For example, network entity 70 (e.g., MMG 56 or streaming media server 60) may carry out the process of FIG. 2 to set the size of transport-layer buffer 106 and/or media buffer 108.

3. Conclusion

Various embodiments of the present invention have been described above. Those skilled in the art will understand, however, that changes and modifications may be made to these embodiments without departing from the true scope and spirit of the present invention, which is defined by the claims.

We claim:

1. A method comprising:
   receiving into a network entity a streaming-media-session initiation message from a wireless communication device (WCD);
   determining at the network entity a WCD buffer size, based at least on one or more features of the WCD; and
   sending from the network entity to the WCD a directive to use the determined WCD buffer size, so as to cause the WCD to set a buffer at the WCD to the determined WCD buffer size.

2. The method of claim 1, wherein determining at the network entity the WCD buffer size, based at least on the one or more features of the WCD comprises:
   determining at the network entity the WCD buffer size based at least on a media player version used by the WCD to request initiation of the streaming media session.

3. The method of claim 1, wherein determining at the network entity the WCD buffer size, based at least on the one or more features of the WCD comprises:
   determining at the network entity the WCD buffer size based at least on (i) the one or more features of the WCD and (ii) a geographic location of the WCD.

4. The method of claim 3, wherein determining at the network entity the WCD buffer size based at least on (i) the one or more features of the WCD and (ii) the geographic location of the WCD comprises:
   determining at the network entity the WCD buffer size based at least on (i) the one or more features of the WCD and (ii) a number of wireless users historically present at the geographic location.

5. The method of claim 3, wherein determining at the network entity the WCD buffer size based at least on (i) the one or more features of the WCD and (ii) the geographic location of the WCD comprises:
   determining at the network entity the WCD buffer size based at least on (i) the one or more features of the WCD and (ii) a data throughput at the geographic location.

6. The method of claim 3, wherein the streaming-media-session initiation message includes an indication of the geographic location of the WCD.

7. The method of claim 1, wherein determining at the network entity the WCD buffer size, based at least on the one or more features of the WCD comprises:
   determining at the network entity a WCD media buffer size, based at least on the one or more features of the WCD.

8. The method of claim 1, wherein determining at the network entity the WCD buffer size, based at least on the one or more features of the WCD comprises:
   determining at the network entity a WCD Transmission Control Protocol (TCP) buffer size, based at least on the one or more features of the WCD.

9. The method of claim 1, wherein determining at the network entity the WCD buffer size, based at least on the one or more features of the WCD comprises:
   determining at the network entity the WCD buffer size based at least on (i) the one or more features of the WCD and (ii) one or more conditions in a radio access network (RAN) currently serving the WCD.

10. The method of claim 1, wherein determining at the network entity the WCD buffer size, based at least on the one or more features of the WCD comprises:
    querying a device capabilities store to determine the one or more features of the WCD.

11. The method of claim 1, wherein the one or more features of the WCD includes one or more of:
    (i) media player version in use on the WCD; and
    (ii) make and model of the WCD.

12. The method of claim 1, wherein the network entity comprises a streaming media server.

13. The method of claim 1, wherein the network entity comprises a server that provides the WCD with a streaming media server network address.

14. The method of claim 13, wherein the network entity is a media gateway.

15. A network entity comprising:
a processor;
a data storage; and
program logic stored in the data storage and executable by the processor (i) to receive a streaming-media-session initiation message from a wireless communication device (WCD), (ii) to determine a WCD buffer size, based at least on one or more features of the WCD, and (iii) to send to the WCD a directive to use the determined WCD buffer size, so as to cause the WCD to set a buffer at the WCD to the determined WCD buffer size.

16. A wireless communication device (WCD) comprising:
a processor;
a data storage, wherein the data storage defines a buffer; and
program logic stored in the data storage and executable by the processor (i) to send a streaming-media-session initiation message to a network entity, (ii) to receive from the network entity a directive to use a buffer size determined based at least on one or more features of the WCD, and (iii) to set the buffer size according to the directive received from the network entity.

17. The WCD of claim 16, wherein the one or more features of the WCD includes:
(i) media player version in use on the WCD; and
(ii) make and model of the WCD.

18. The WCD of claim 16, wherein the buffer includes a media buffer.

19. The WCD of claim 16, wherein the buffer includes a transport-layer buffer.

20. The WCD of claim 16, wherein the streaming-media-session initiation message includes an indication of a geographic location of the WCD.

* * * * *